United States Patent
Shirai

(10) Patent No.: US 6,310,905 B1
(45) Date of Patent: Oct. 30, 2001

(54) MIRROR FOR AN ULTRAVIOLET LASER AND METHOD

(75) Inventor: Takeshi Shirai, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/256,668

(22) Filed: Feb. 25, 1999

(30) Foreign Application Priority Data

Feb. 26, 1998 (JP) .................................................. 10-045465
Dec. 11, 1998 (JP) .................................................. 10-352801

(51) Int. Cl.$^7$ .............................. H01S 3/08; G02B 5/08
(52) U.S. Cl. ............................ 372/99; 359/360; 359/584
(58) Field of Search ............................. 372/99; 359/584, 359/586, 360

(56) References Cited

U.S. PATENT DOCUMENTS

| | | | |
|---|---|---|---|
| 4,856,019 | 8/1989 | Miyata et al. | 372/99 |
| 5,850,309 | * 12/1998 | Shirai et al. | 359/360 |

\* cited by examiner

*Primary Examiner*—James W. Davie
(74) *Attorney, Agent, or Firm*—Anderson, Kill & Olick, P.C.

(57) ABSTRACT

A mirror for an ultraviolet laser and method of formation such that the mirror is highly reflective to a laser beam generated in the ultraviolet spectrum over a wide range of incident angles and has little fluctuation in polarization reflectivity in relation to a change in an incident angle of the beam. The mirror has a structure comprising an aluminum (Al) film coated over a substrate and a dielectric multi-layer film coated over the aluminum film. The dielectric multi-layer film comprises alternating layers of a low refractive index layer and a high refractive index layer according to the following relationship: $L_1/[H/L_2]^x$ and with an optical thickness according to the following relationship:

$$2L_1 = L_2 \approx H = 0.25 \sim 0.35\lambda;$$

or $$2L_1 \approx L_2 = H = 0.25 \sim 0.35\lambda;$$

wherein:

$L_1$, $L_2$: represents the low refractive index layers;
H: represents the high refractive index layer(s); and
X: is an integer between 1 to 10.

9 Claims, 7 Drawing Sheets

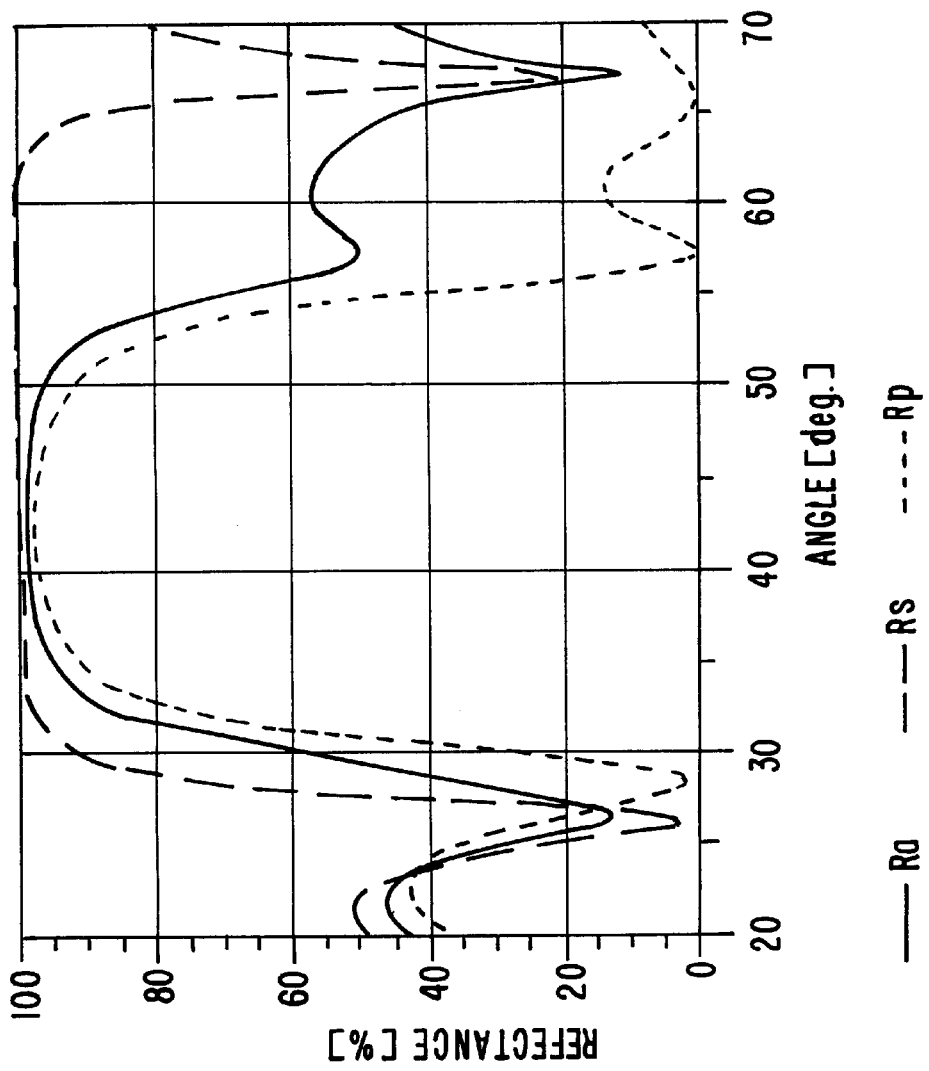

MIRROR FOR AN ULTRAVIOLET LASER AND METHOD

FIELD OF THE INVENTION

The present invention relates to a mirror for an ultraviolet laser and method of formation. More particularly the present invention relates to a mirror which is highly reflective to a laser beam oscillated in the ultraviolet spectrum over a wide range of incident angles and which has little fluctuation in polarization reflectivity in relation to a change in the incident angle of the beam in the mirror.

BACKGROUND OF THE INVENTION

In recent years, higher resolution is being demanded of a reduced projection aligner (stepper) for use in photolithograpic semiconductor manufacturing in order to increase integration of semiconductor devices. As a means to increase the photolithograpic resolution of the above stepper, it has been suggested that the wavelength of the light source used in the stepper should be shortened. Currently, a stepper oscillates a light beam using a high-power excima laser as the light source in a shorter wave spectrum compared to that of a mercury lamp. The optical system of this type of stepper is formed of a combination of various optical devices such as a lens and mirror.

The mirror is used for returning and bending the light beam in the optical system of the stepper. A convex or concave mirror can be formed having the necessary imaging capacity provided the mirror has sufficient refractive index in relation to a range of incident angles of the light beam for either a convergent beam or a divergent beam.

Two known examples of a conventional mirror for an ultraviolet laser are shown in FIGS. 5 and 7 respectively.

A first example of a conventional mirror is shown in FIG. 5 depicting a structure including a dielectric multi-layer film 13 positioned on a substrate 11. The dielectric multi-layer film 13 comprises alternating layers of high refractive index film and low refractive index film. The optical thickness of each layer in the dielectric multi-layer film 13 at a given incident angle θ is $\lambda/4$ determined by the following equation:

$$nd = \frac{\lambda/4}{\cos\{\sin^{-1}(\sin\theta/n)\}} \quad \text{[Equation 1]}$$

where: $n$ = number of layers $d$ = optical thickness

In other words, the optical thickness at a given incident angle is periodic at $\lambda/4$ such that high reflectivity can be obtained at the given incident angle. Also, the period of about $\lambda/4$ is optimized by a calculation using a calculator.

The incident angle characteristics of a laser mirror of the first example at $\lambda=193.4$ nm is shown in FIG. 6. The s-polarized beams (Rs) and p-polarized beams (Rp) of FIG. 6 that yield over 95% reflectivity (% reflectance) lie within a narrowly designated incident angle range. For this example the range of incident angle which will yield over 95% reflectivity is between 35° and 52°. At all other angles of incidence the percent reflectivity drastically decreases such that a mirror of this type is not suitable in cases where a high reflectivity yield is desired over a wider range of incident angle.

A second example of a conventional mirror is shown in FIG. 7 depicting a structure including an Al film 12 of about 2000 Å formed on a substrate 11. A protective film 14 of e.g. $MgF_2$ of about 1500 Å is formed over the Al film 12 to prevent deterioration of the Al film 12 by oxidation.

The incident angle characteristics of a laser mirror of the second example at $\lambda=193.4$ nm is shown in FIG. 8. As shown in FIG. 8 when the incident angle increases, the reflectivity of the s-polarized beam Rs increases, and the reflectivity of the p-polarized beam Rp decreases such that polarization components are separated. When such a laser mirror is used in the optical system of a stepper, imaging performance tends to fluctuate. Also, a mirror with low reflectivity yields causes the amount of light to decrease such that efficiency in exposure declines. In addition, lowered resistance of the laser and deformation of the mirror surface tend to be caused by absorption of heat.

The above problem can be more prominent as the number of mirrors increase.

The present invention solves the above problems using a mirror for an ultraviolet laser structured to provide excellent incident angle characteristics in the ultraviolet spectrum so as to be highly reflective to a laser beam in the ultraviolet spectrum over a wide range of incident angles and to provide little fluctuation in polarization reflectivity in relation to a change in the incident angle i.e., to possess small separation in its polarization component(s).

SUMMARY OF THE INVENTION

A mirror for an ultraviolet laser in accordance with the present invention comprises a substrate having a first layer formed of an aluminum film (Al) and a second layer superimposed over the first layer with the second layer being composed of a dielectric multi-layer film having an alternating arrangement of layers of low refractive index and high refractive index and wherein the dielectric multi-layer film satisfies the following relationship:

$$L_1/[H/L_2]^x$$

wherein:

$L_1$, $L_2$: represents the low refractive index layers;

H: represents the high refractive index layer(s); and

X: defines an integer between 1 and 10 and wherein the dielectric multiple-layer film has an optical thickness based upon the wavelength $\lambda$ which satisfies the relationship:

$$2L_1 \approx L_2 \approx H = 0.25 \sim 0.35\lambda;$$

or $$2L_1 = L_2 = H = 0.25 \sim 0.35\lambda.$$

In accordance with the above relationship the low refractive index layers $L_1$ and $L_2$ are identified separately since each may be composed of a different material and may differ in thickness whereas the above relationship refers to the high refractive index layer(s) using the same letter H since the composition of each high refractive index layer and thickness for the mirror is the same. Each high refractive index layer should preferably be composed of one or more materials selected from the following substances, or mixtures or compounds of the following substances: neodymium fluoride ($NdF_3$), lanthanum fluoride ($LaF_3$), gadolinium fluoride ($GdF_3$), dysprosium fluoride ($DyF_3$), aluminium oxide ($Al_2O_3$), lead fluoride ($PbF_2$), and hafnium oxide ($HfO_2$); and the low refractive index layer should preferably be composed of one or more materials selected from the following substances, or mixtures or compounds of the following substances: magnesium fluoride ($MgF_2$), aluminium fluoride ($AlF_3$), sodium fluoride (NaF), lithium fluoride (LiF), calcium fluoride ($CaF_2$), barium fluoride ($BaF_2$), strontium fluoride ($SrF_2$), silicon oxide ($SiO_2$), cryolite ($Na_3AlF_6$), and thiolite ($Na_5Al_3F_{14}$).

BRIEF DESCRIPTION OF THE DRAWINGS

FIG. 6 is a graph showing incident angle characteristics of a mirror for the conventional ultraviolet laser of FIG. 5 at $\lambda=193.4$ nm;

DETAILED DESCRIPTION OF THE INVENTION

The following is a description of various embodiments of a mirror for an ultraviolet laser according to the present invention in relation to drawings.

Figure 1:
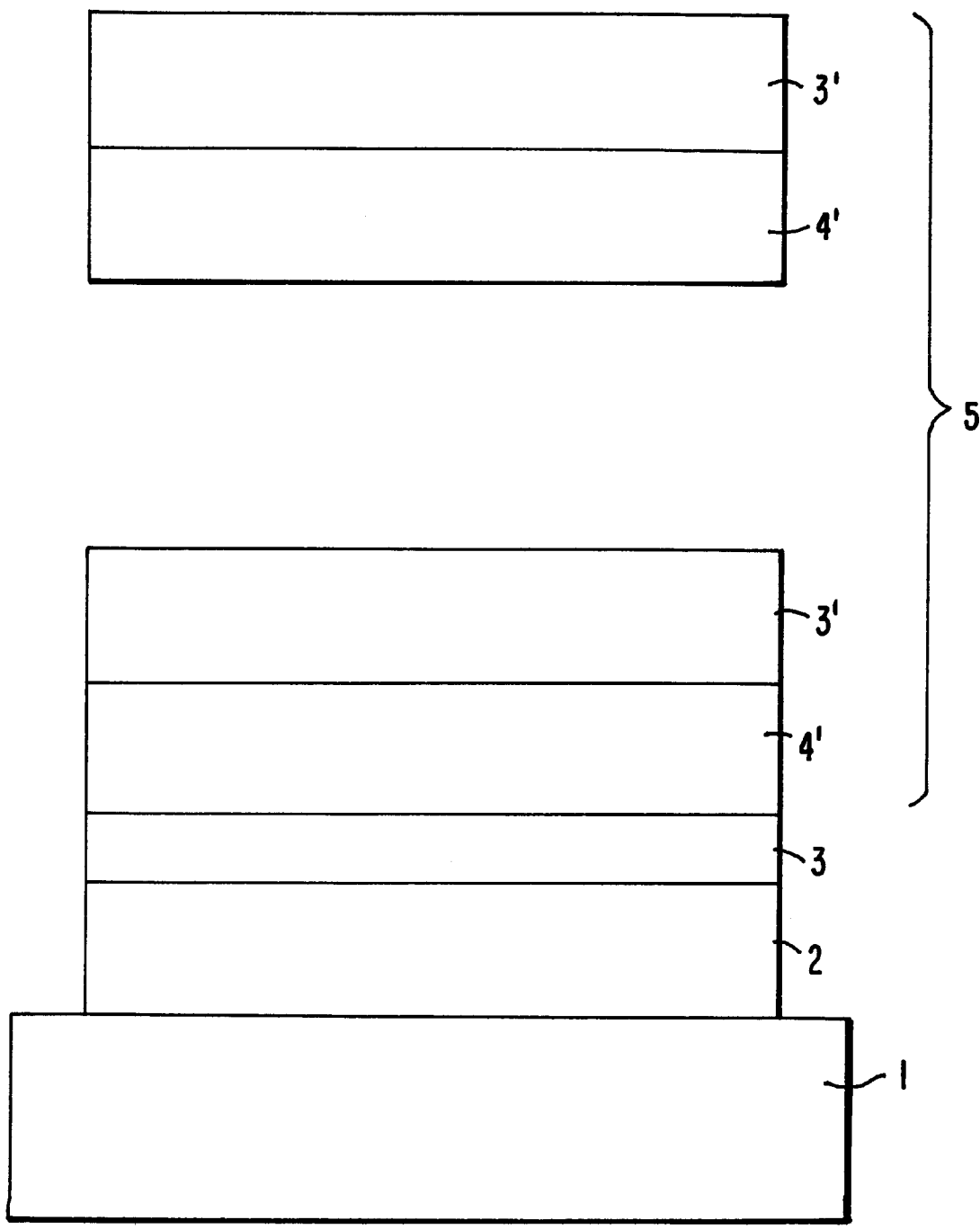
FIG. 1 is a schematic cross section of a mirror for an ultraviolet laser of Embodiment 1 of the subject invention.

Embodiment 1 of the subject invention is shown in FIG. 1 depicting a mirror for an ultraviolet laser having a substrate 1 of synthetic quartz glass. A coating of an aluminum (Al) film 2 is formed on the substrate 1 having a geometric thickness of about 2000 Å. A coating of a low refractive index layer 3 such as of magnesium fluoride having an optical thickness of 0.155 $\lambda$ is formed over the Al film 2. Embodiment 1 includes a plurality of alternating layers identified as a group 5 of low and high refractive index films superimposed over the low refractive index layer 3 with a high refractive index film 4' in the group 5 contiguous to the low refractive index layer 3. Each pair in the plurality of alternating layers 5 includes a low refractive index film layer 3' and a high refractive index film layer 4'. The plurality of alternating layers 5 should preferably include at least three pairs of alternating film layers 3' and 4' respectively. Each high refractive index film layer 4' is composed of lanthanum fluoride having an optical thickness of 0.29 $\lambda$ whereas each low refractive index film layer 3' is composed of magnesium fluoride having an optical thickness of 0.310 $\lambda$. In this embodiment the difference between the low refractive index film layer 3 and the low refractive index film layer 3' is its optical thickness. Moreover, for purposes of the first embodiment the combination of three pairs of alternating layers 5 superimposed on a low refractive index layer 3 of magnesium fluoride constitutes a dielectric multi-layer film.

Each of the coated film layers may be formed on the substrate 1 by a known technique such as resistance heating deposition, ion beam deposition and sputtering.

The optical thickness of each layer in the three pairs of alternating layers 5 is optimized to maintain high reflectivity for a laser beam of $\lambda=193.4$ nm entering the dielectric multi-layer film at 55° and an optical distance of about $\lambda/14$.

Furthermore, the thickness of the magnesium fluoride low refractive index layer 3 located between the Al film 2 formed on the substrate 1 and the three pairs of alternating layers 5 is optimized. As a result, the mirror of embodiment 1 including the Al film 2, low refractive index layer 3 and three pairs of alternating layers 5 shows high reflectivity over a wide range of incident angles and is less dependent on the incident angle.

Figure 2:
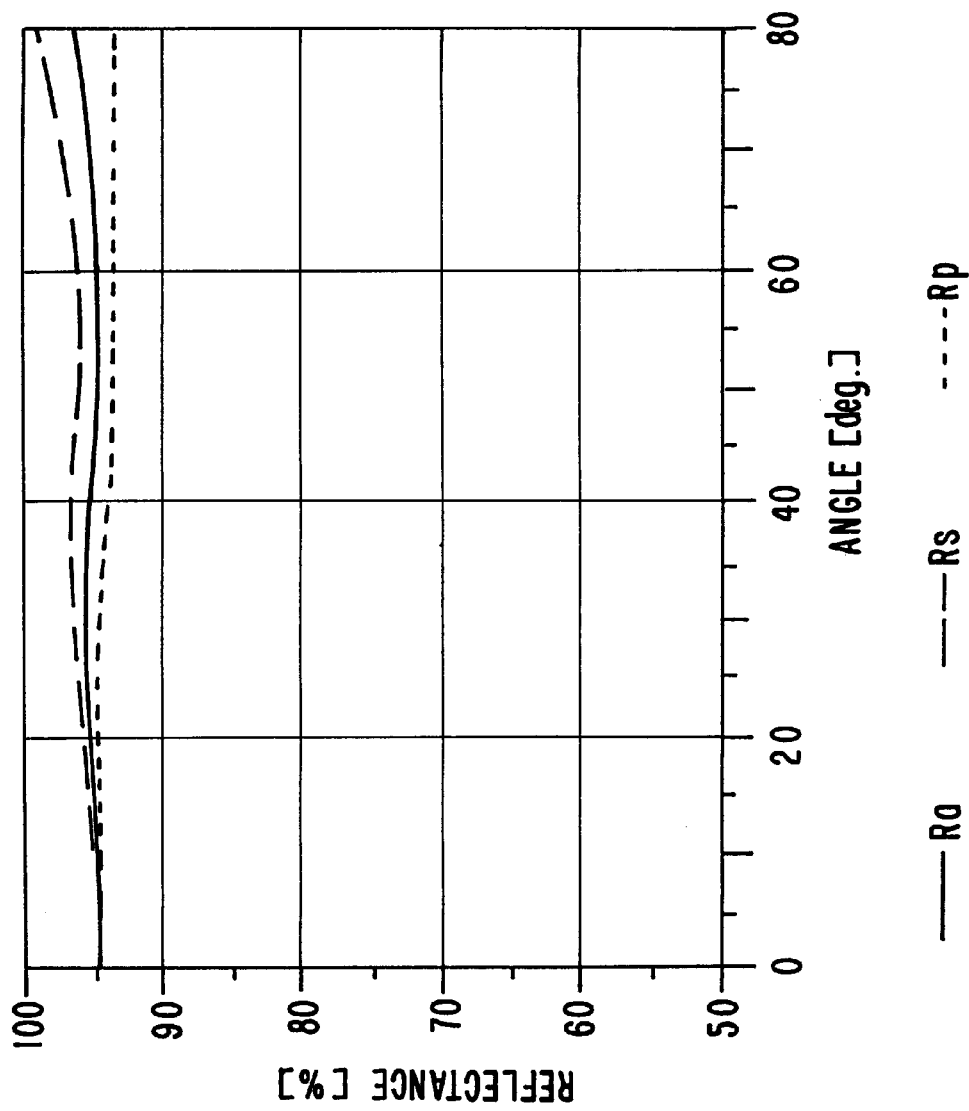
FIG. 2 is a graph showing incident angle characteristics of a mirror for the ultraviolet laser of FIG. 1 at $\lambda=193.4$ nm.

FIG. 2 shows the incident angle characteristics of the mirror for an ultraviolet laser for embodiment 1 at $\lambda=193.4$ nm. As evident from FIG. 2, high reflectivity of over 95% exists for the mirror of embodiment 1 over a wide range of incident angles between $\theta=10$ and 80° with small separation in polarization components in relation to a change in the incident angle.

Figure 3:
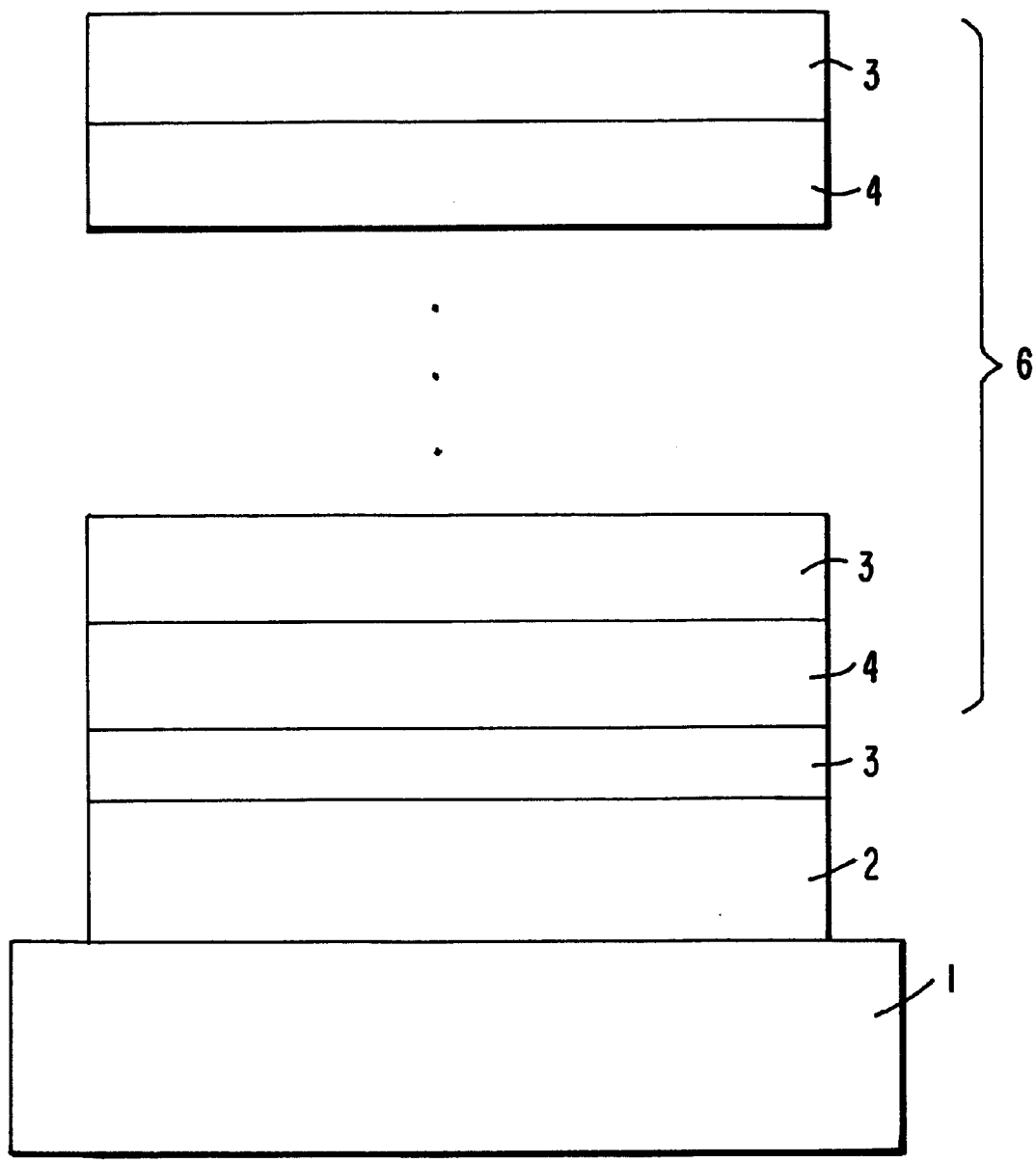
FIG. 3 is a schematic cross section of a mirror for an ultraviolet laser of Embodiment 2 of the subject invention.

Embodiment 2 of the subject invention is shown in FIG. 3 representing a schematic cross section of a mirror for an ultraviolet laser comprising a finely ground synthetic quartz glass substrate 1 having a film coating of aluminum Al 2 of a geometric thickness of about 2000 Å, a coated low refractive index layer of magnesium fluoride 3 having an optical thickness of 0.160 $\lambda$; and a group 6 of four pairs of alternating layers with each pair including a high refractive index layer 4' of lanthanum fluoride with an optical thickness of 0.29 $\lambda$ and a low refractive index layer 3' of magnesium fluoride having an optical thickness of 0.320 $\lambda$.

Each of the coated film layers in embodiment 2 may be formed on the substrate 1 by a known technique such as resistance heating deposition, ion beam deposition and sputtering.

The optical thickness of each layer in the four pairs of alternating layers 6 is optimized to maintain high reflectivity for a laser beam of $\lambda=193.4$ nm entering the dielectric multi-layer film at 60° and an optical distance of about $\lambda/4$.

Furthermore, the thickness of the magnesium fluoride low refractive index layer 3 located between the Al film 2 formed on the substrate 1 and the four pairs of alternating layers 6 is optimized. As a result, the mirror of embodiment 2 including the Al film 2, low refractive index layer 3 and four pairs of alternating layers 6 shows high reflectivity over a wide range of incident angles and is less dependent on the incident angle.

Figure 4:
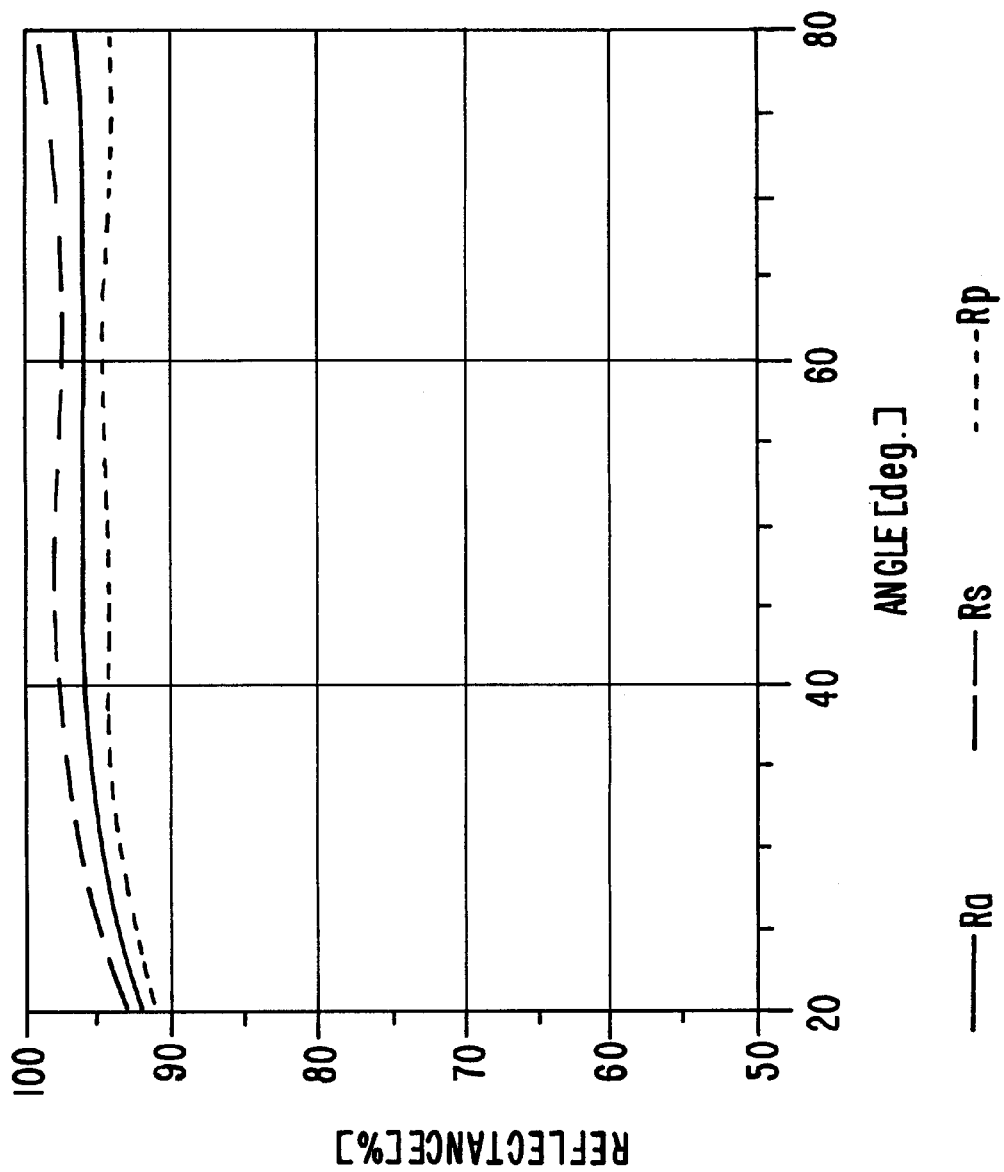
FIG. 4 is a graph showing incident angle characteristics of a mirror for the ultraviolet laser of FIG. 3 at $\lambda=193.4$ nm.
Figure 5:
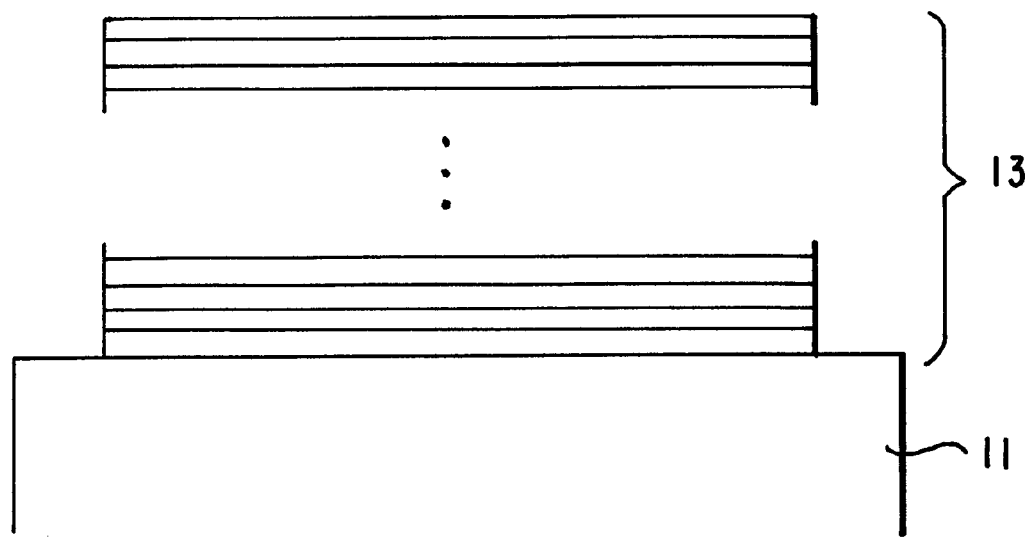
FIG. 5 is a schematic cross section of a conventional mirror for an ultraviolet laser.
Figure 7:
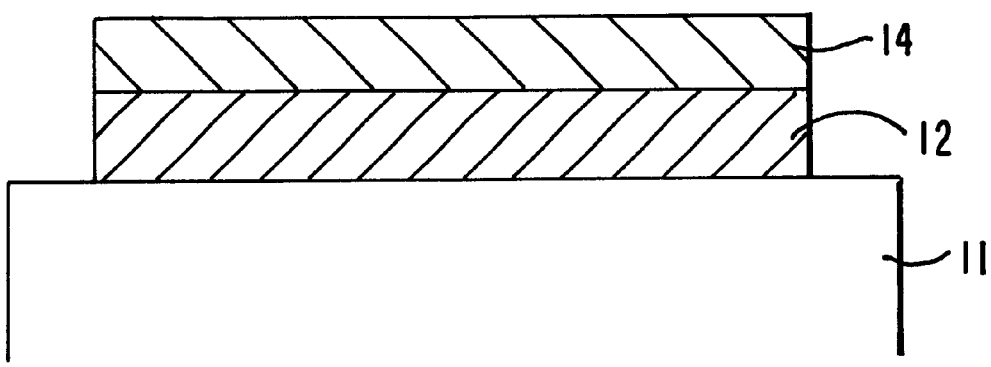
FIG. 7 is a schematic cross section of another conventional mirror for an ultraviolet laser.
Figure 8:
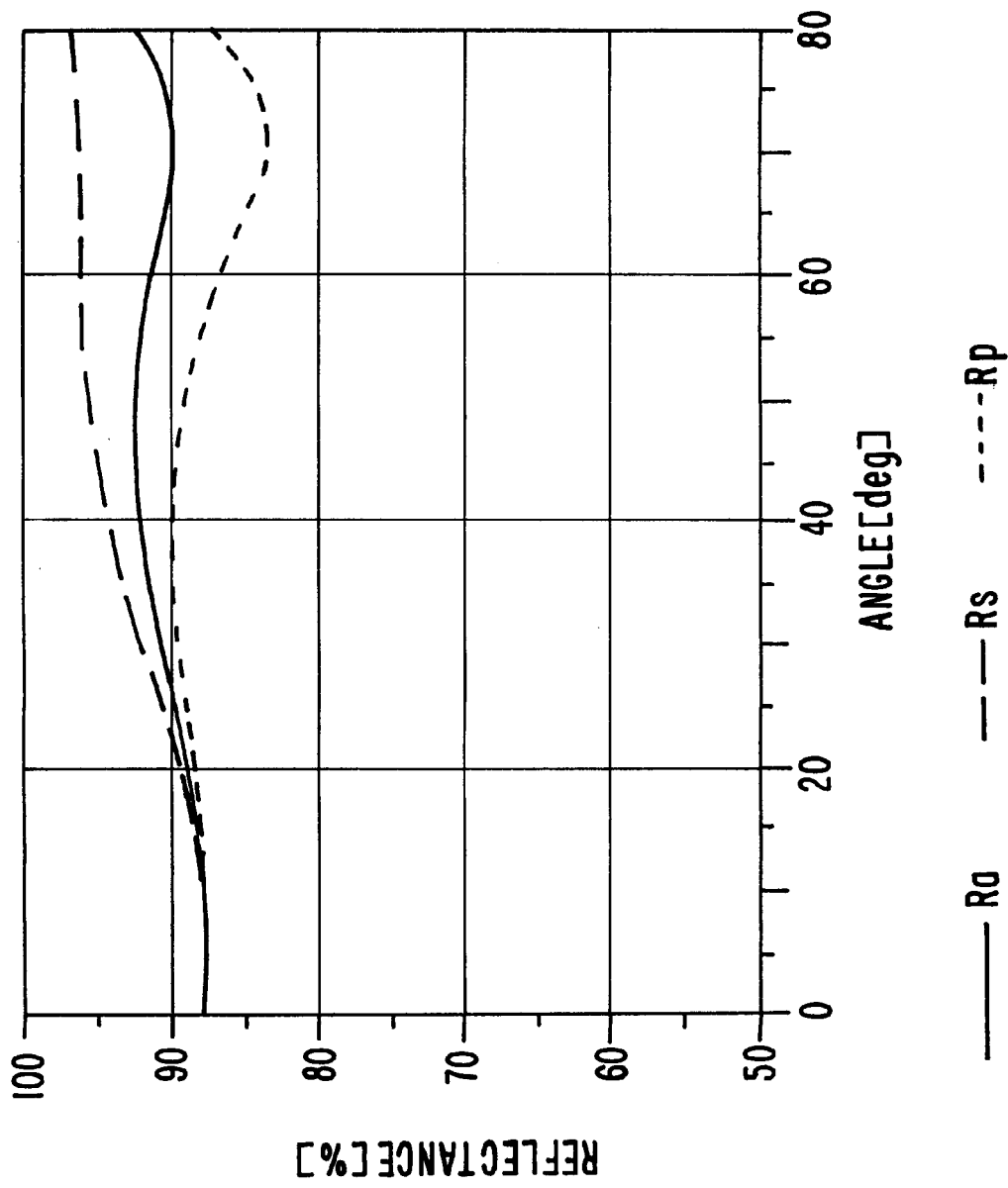
FIG. 8 is a graph showing incident angle characteristics of a mirror for the ultraviolet laser of FIG. 7 at $\lambda=193.4$ nm.

FIG. 4 shows the incident angle characteristics of the mirror for an ultraviolet laser in embodiment 2 at $\lambda=193.4$ nm. As evident from FIG. 2, high reflectivity of over 95% exists for the mirror of embodiment 1 over a wide range of incident angles between $\theta=30$ and 70° with small separation in polarization components in relation to a change in the incident angle.

Each high refractive index layer in the mirror for an ultraviolet laser of the present invention should be composed of one or more materials selected from the following substances, or mixtures or compounds of the following substances:

neodymium fluoride ($NdF_3$), lanthanum fluoride ($LaF_3$), gadolinium fluoride ($GdF_3$), dysprosium fluoride ($DyF_3$), aluminium oxide ($Al_2O_3$), lead fluoride ($PbF_2$), and hafnium oxide ($HfO_2$).

Each low refractive index layer in the mirror for an ultraviolet laser of the present invention should be composed of one or more materials selected from the following substances, or mixtures or compounds of the following substances:

magnesium fluoride ($MgF_2$), aluminium fluoride ($AlF_3$), sodium fluoride (NaF), lithium fluoride (LiF), calcium fluoride (CaF$_2$), barium fluoride (BaF$_2$), strontium fluoride (SrF$_2$), silicon oxide (SiO$_2$), cryolite (Na$_3$AlF$_6$), and thiolite (Na$_5$Al$_3$F$_{14}$).

Since the Al film 2 is formed on the substrate 1, any material which can be shaped in a given shape can be used for the substrate 1 preferably a material characterized by optical crystals through which a laser beam can transmit such as a glass selected from the group consisting of: quartz glass, fluorite, and magnesium fluoride or a material having excellent properties of thermal expansion and thermal conductivity such as ceramics, silicon, silicon carbide, and tungsten.

It should be understood that the geometric thickness of the aluminum film (Al) layer 2 is considered to be sufficient at 1000 Å but can be thicker than this value.

The mirror for an ultraviolet laser of the present invention is highly reflective to a laser beam generated in the ultraviolet spectrum for a wide range of incident angles and has a little fluctuation in polarization reflectivity in relation to a change in an incident angle of the beam. Therefore, by using the mirror for an ultraviolet laser of the present invention in an optical system of a stepper, imaging performance does not fluctuate, and efficiency in exposure is not decreased.

What is claimed is:

1. A mirror for an ultraviolet laser comprising a substrate, an aluminum film formed contiguous to the substrate; a first low refractive index layer superimposed over said aluminum film and having an optical thickness of 0.125–0.175 $\lambda$, where $\lambda$ is the laser beam wavelength; a second layer superimposed over said first layer, said second layer comprising a dielectric multi-layer film having an alternating arrangement of layers of low refractive index and high refractive index, each of said layers of said multi-layer film having an optical thickness of 0.25–0.35 $\lambda$ and wherein the dielectric multiple-layer film structure is shown by the following representation:

$$L_1/[H/L_2]^X$$

where:

$L_1$, $L_2$: represents the low refractive index layers;
H: represents the high refractive index layer(s); and
X: defines an integer between 1 and 10.

2. A mirror for an ultraviolet laser as defined in claim 1 wherein each high refractive index layer is composed of one or more materials selected from the group consisting of: neodymium fluoride (NdF$_3$), lanthanum fluoride (LaF$_3$), gadolinium fluoride (GdF$_3$), dysprosium fluoride (DyF$_3$), aluminium oxide (Al$_2$O$_3$), lead fluoride (PbF$_2$), and hafnium oxide (HfO$_2$).

3. A mirror for an ultraviolet laser as defined in claim 2 wherein each low refractive index layer of said first layer and said second layer is composed of one or more materials selected from the group consisting of: magnesium fluoride (MgF$_2$), aluminium fluoride (AlF$_3$), sodium fluoride (NaF), lithium fluoride (LiF), calcium fluoride (CaF$_2$), barium fluoride (BaF$_2$), strontium fluoride (SrF$_2$), silicon oxide (SiO$_2$), cryolite (Na$_3$AlF$_6$), and thiolite (Na$_5$Al$_3$F$_{14}$).

4. A mirror for an ultraviolet laser as defined in claim 3 wherein said second layer comprises a high refractive index layer contiguous to said first low refractive index layer and three pairs of layers of high refractive index and low refractive index in an alternating arrangement so that each high refractive index layer follows a low refractive index layer.

5. A mirror for an ultraviolet laser as defined in claim 4 wherein said second layer comprises a high refractive index layer contiguous to said first low refractive index layer and four pairs of layers of high refractive index and low refractive index in an alternating arrangement so that each high refractive index layer follows a low refractive index layer.

6. A mirror for an ultraviolet laser as defined in claim 5 wherein said substrate is of a material selected from the group consisting of quartz glass, fluorite, magnesium fluoride or a material having excellent properties of thermal expansion and thermal conductivity selected from the group consisting of ceramics, silicon carbide, and tungsten.

7. A method of forming a mirror for an ultraviolet laser comprising the steps of:

forming an aluminum film on a substrate so that the Al film thickness is at least about 1000 Å; forming a coating having a low refractive index with an optical thickness between 0.125–0.175 $\lambda$ on the aluminum film where $\lambda$ is the wavelength of the laser beam; superimposing a dielectric multi-layer film on the low refractive index coating composed of an alternating arrangement of layers of high refractive index with an optical thickness between 0.25–0.35 $\lambda$ and low refractive index with an optical thickness between 0.25–0.35 $\lambda$ so that each high refractive index layer follows a low refractive index layer and with the dielectric multiple-layer film structure being shown by the following representation:

$$L_1[H/L_2]^X$$

where:

$L_1$, $L_2$: represents the low refractive index layers;
H: represents the high refractive index layer(s); and
X: defines an integer between 1 and 10.

8. A method of forming a mirror for an ultraviolet laser as defined in claim 7 wherein said alternating arrangement of layers is formed in pairs with each pair having a layer of low refractive index and a layer of high refractive index and wherein said arrangement includes at least three pairs.

9. A method of forming a mirror for an ultraviolet laser as defined in claim 8 wherein said arrangement includes at least four pairs.

* * * * *